(12) United States Patent
Wong et al.

(10) Patent No.: US 10,007,693 B1
(45) Date of Patent: Jun. 26, 2018

(54) DYNAMIC DETERMINATION OF CATEGORICAL SEARCH RESULTS

(71) Applicant: Amazon Technologies, Inc., Seattle, WA (US)

(72) Inventors: Cherie Wong, Seattle, WA (US); Aaron Wai-Chi Brady, Seattle, WA (US); Sunetra Arun Deshpande, Seattle, WA (US); Keith David Miller, Wethersfield, CT (US); Ankita Singh, Seattle, WA (US); Dominick James Turiano, Seattle, WA (US); Peter C. Wong, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 333 days.

(21) Appl. No.: 14/832,619

(22) Filed: Aug. 21, 2015

(51) Int. Cl.
*G06F 17/30* (2006.01)

(52) U.S. Cl.
CPC .... *G06F 17/30371* (2013.01); *G06F 17/3053* (2013.01); *G06F 17/30598* (2013.01); *G06F 17/30867* (2013.01)

(58) Field of Classification Search
CPC ......... G06F 17/30371; G06F 17/30867; G06F 17/30598; G06F 17/3053; G06F 17/30067; G06Q 20/12; G06Q 20/123

USPC ....... 707/692, 708, 710, 723, 737, 749, 805; 705/26.1, 27.1; 715/968
See application file for complete search history.

(56) References Cited

U.S. PATENT DOCUMENTS

| | | | |
|---|---|---|---|
| 2007/0005583 A1* | 1/2007 | Chau | G06F 17/30604 |
| 2008/0109285 A1* | 5/2008 | Reuther | G06F 17/30864 705/7.11 |
| 2008/0222132 A1* | 9/2008 | Pan | G06F 17/30867 |
| 2014/0095359 A1* | 4/2014 | Aliabadi | G06Q 30/02 705/28 |
| 2014/0282153 A1* | 9/2014 | Christiansen | G06Q 30/0201 715/765 |

* cited by examiner

*Primary Examiner* — Greta L Robinson
(74) *Attorney, Agent, or Firm* — Thomas | Horstemeyer, LLP

(57) ABSTRACT

Disclosed are various embodiments for generating a de-duplicated and subcategory summary search results in response to a search query. A set of original search results and a set of categorical search results may be obtained in response to a search query. The original search results may be relevant to the search query while the categorical search results may be relevant to the search query and a category. The items in the categorical search results may be associated with various subcategories. The duplicate items in the categorical search results and at least a portion of the original search results may be removed from the categorical search results. The repeated instances of each of the subcategories may be removed from the categorical search results.

20 Claims, 9 Drawing Sheets

DYNAMIC DETERMINATION OF CATEGORICAL SEARCH RESULTS

BACKGROUND

Users may search for various items to purchase or lease via user interfaces. In some situations, duplicate items may be presented in the search results, wasting valuable real estate on the screen displaying the search results to the user. Similarly, multiple items presented on at least a portion of the screen may be associated with the same category. For example, the search results displayed may include multiple items of the same brand, instead of various different brands.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating a category-specific set of search results including items that are different from at least a portion of a set of original search results. The categorical search results may be relevant to a search query and a category such that the categorical search results include items of the same category but multiple different subcategories. In one embodiment, the category may be specified to a user or set to a default if the user has not specified a category. The set of original search results may include a plurality of items associated with the search query and may be generated in response to receiving the search query. The items in at least a portion of the categorical search results may be compared to at least a portion of the items in the regular search results to determine whether any of the items match. The matched items may then be removed from the categorical search results. In one embodiment, the matched items may be appended to the end of the categorical search results.

The present disclosure also relates to generating a category-specific set of search results that includes a predefined number of items in which each item is associated with a different subcategory. In various embodiments, the categorical search results may include repeated instances of a subcategory. In one embodiment, the second instance of each of the subcategories can be removed from the categorical search results. As an illustrative example, suppose the categorical search results include sixteen items relevant to a search query for "shirts" and a category of brands. In this case, the items in the categorical search results can include two items associated with the same brand. The second item associated with the same brand can be removed. In this way, categorical search results can include only one item associated with each of the subcategories. In the following discussion, a general description of the system and its components is provided, followed by a discussion of the operation of the same.

Figure 1:
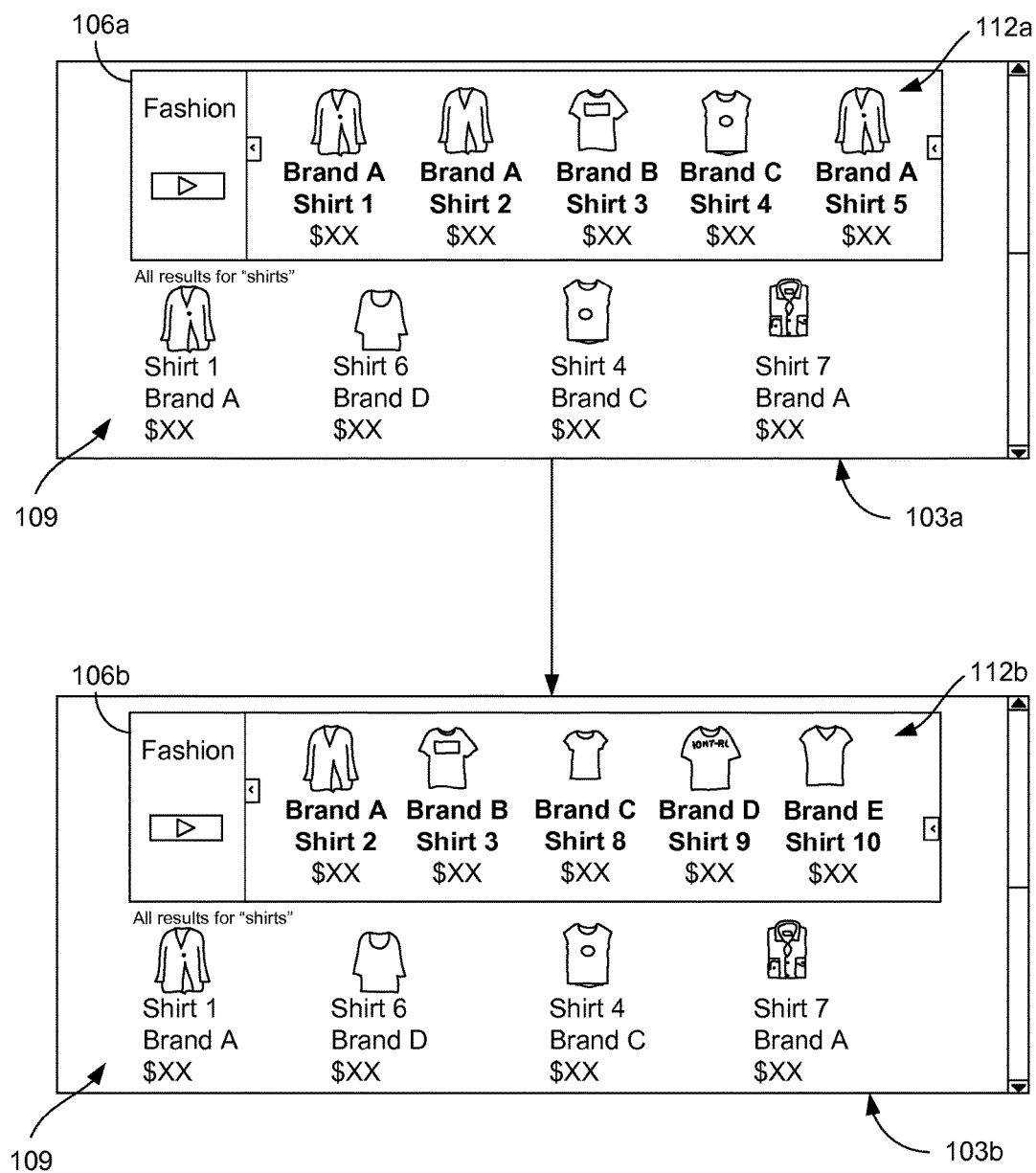
FIG. 1 is a pictorial diagram of portions of example user interfaces rendered by a client device according to various embodiments of the present disclosure.

With reference to FIG. 1, shown is an example of portions user interfaces that can be rendered by a client according to various embodiments. As discussed above, users can perform various actions on network pages and/or user interfaces that relate to searching for items and viewing search results. In the example of FIG. 1, the user interfaces can be generated in response to a user submitting a search query. In particular, FIG. 1 shows a duplicate interface 103*a* and a de-duplicated brand summary interface 103*b*. The duplicate interface 103*a* includes a set of original search results 109 and a set of categorical search results 112*a*. The duplicate interface 103*a* may display the set of categorical search results 112*a* in a summary banner 106*a*. The original search results 109 may include information related to a plurality of items, each being associated with an item and/or related to a given search query received from a client device of a user. The number of items included in original search results 109 may be limited to a predefined number or be unlimited. The items in the original search results 109 may be ordered or ranked according to a degree of relevance to the search query or a user-specified order of rank. For example, the items in the original search results 109 may be ordered based on popularity, price, sponsorship, user preferences, user purchase history, user activity history, third party data, user wish lists, and other data related to the search query and/or user.

The set of categorical search results 112*a* may include a plurality of items associated with the search query and a category. The number of items included in the categorical search results 112 may be limited to a predefined number either set to a default or set by the user. In one embodiment, the number of items included in the categorical search results 112 may be based on a limited number of subcategories associated with a category. For example, suppose that a category 236 has less than ten subcategories, then the number of items in the categorical search results 112 may include the less than ten items or may include additional items by repeating the subcategory.

In the embodiment shown in duplication interface 103*a* in FIG. 1, the search query received from a user may include the text "shirts." The set of original search results 109, as shown in the bottom half of the duplication interface 103*a*, may be generated to include Shirt 1, Shirt 6, Shirt 4, and Shirt 7. The set of categorical search results 112*a*, as shown in FIG. 1, may be generated based on the category of brands. In the example shown in FIG. 1, the set of categorical search results include Shirt 1, Shirt 2, Shirt 3, Shirt 4, and Shirt 5. The duplicate interface 103*a* includes the summary banner 106a that distinguishes the set of categorical search results 112a from the set of original search results 109.

The set of categorical search results 112a and the set of original search results 109 may include duplicate items. As shown in FIG. 1, the set of categorical search results 112a that is shown in the summary banner 106a includes Shirt 1 and Shirt 4, which are also included in the top row of the set of original search results 109 shown on the duplicate interface 103a. In this way, the duplicate interface 103a shows an example in which valuable real estate of the user interface is wasted by presenting the same item repeatedly in a finite portion of a screen that is presented to a user.

The summary banner 106a, as shown in FIG. 1, also includes items of the same brand in the first partition presented to the user. As shown in FIG. 1, Shirt 1, Shirt 4, and Shirt 5 each are associated with the same brand, Brand A. In this way, the summary banner 106a shown in FIG. 1 may be presenting items that are too similar to one another without providing an accurate depiction of the wide variety of brands of shirts available.

The de-duplicated brand summary interface 103b shown in FIG. 1 is also a user interface configured to present the set of original search results 109 and the set of categorical search results 112b to the user. Similar to the summary banner 106a of duplicate interface 103a, the first partition of the summary banner 106b also presents at least a subset of the items from the categorical search results 112b. However, the categorical search results 112b no longer include items that are also in the top row of items of the original search results 109 displayed below the summary banner 106b. Further, the subsets of the items associated with the categorical search results 112b shown in the summary banner 106b present shirts of different brands. In this way, the first set of items displayed in the first partition of the summary banner 106b include items of different brands and items that are different than at least the first row of items of the set of original search results 109.

Figure 2:
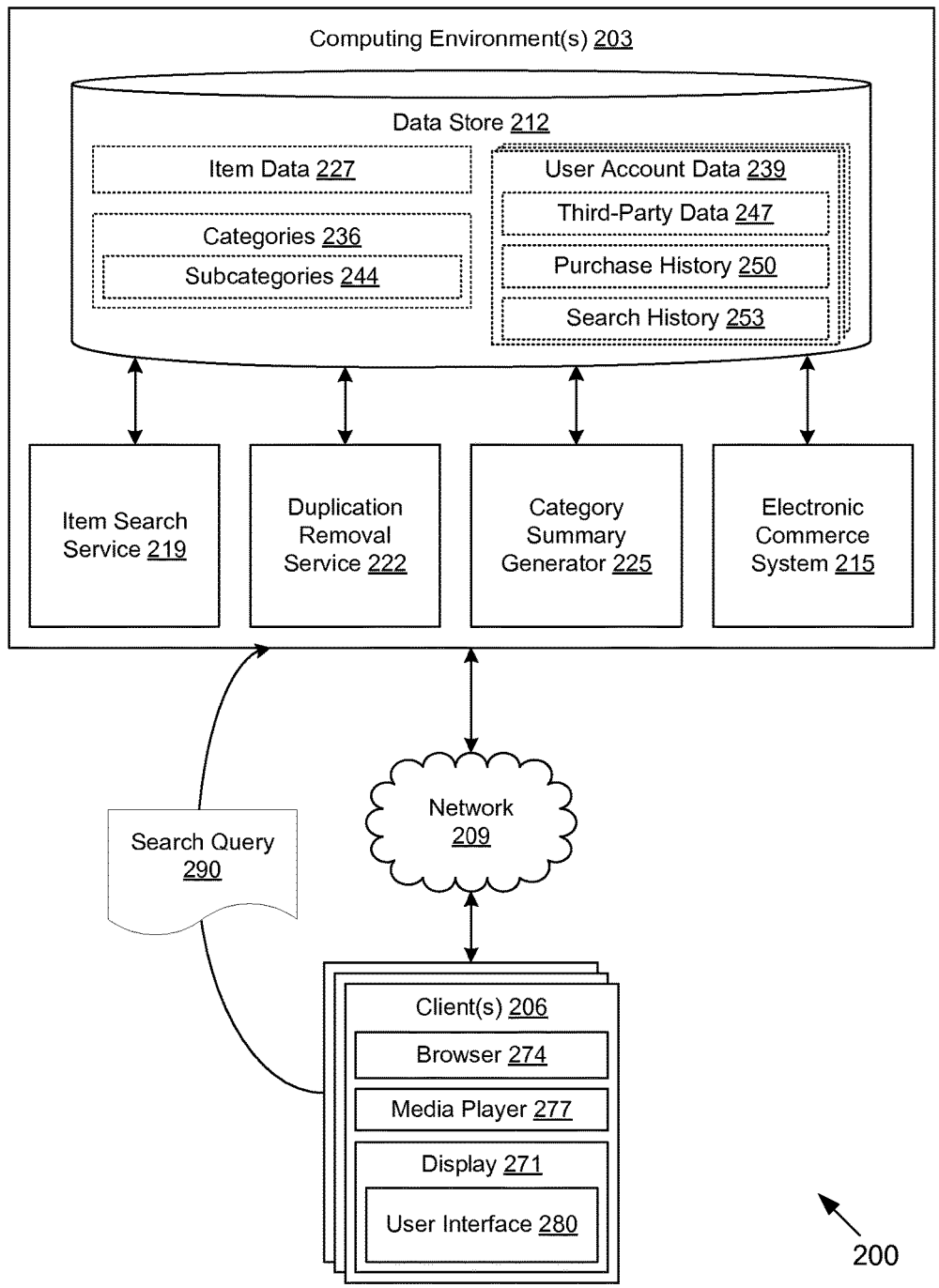
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include the electronic commerce system 215, item search service 219, duplication removal service 222, category summary generator 225, and other applications, services, processes, systems, engines, or functionality not discussed in detail herein. The electronic commerce system 215 is executed in order to facilitate the online purchase of items and other services over the network 209. The electronic commerce system 215 also performs various backend functions associated with the online presence of an organization to facilitate the online purchase of the items. For example, the electronic commerce system 215 may generate network pages or portions thereof that are provided to clients 206 for the purposes of selecting items for purchase, rental, download, lease, or other forms of consumption.

According to some embodiments, the item search service 219 is executed to obtain a search query 290 from a client device of a user and generate a network page containing original search results 109 that are relevant to the search query. The search query 290 may include text, such as, for example, a character string. The search query 290 may alternatively include an image, sound, video, and/or any other form of content that may be obtained from the client device. In some embodiments, the user may download a network page containing a search form through a browser. The search form may include a field such as a text box for the user to enter the search query.

In some embodiments, the item search service 219 may also be executed to obtain and/or generate a set of categorical search results 112. The categorical search results 112 may be associated with a category. In one embodiment, the category may be set to a default category. For example, suppose a user entered a search query 290 for "shirts" via a user interface rendered on a client 206. In an embodiment in which the default category is set to brands, the categorical search results 112 may only include items that are relevant to the search query 290 and are associated with certain brands. In another embodiment, the user may specify the category in the user preferences or during the process of searching for an item. For example, the user may be searching for "video games," and the user may specify, via a user interface, the category of "sports." In such an example, the set of categorical search results 112 may only include sports-related video games.

According to some embodiments, the duplication removal service 222 can remove any duplicate items that are in a first set of items in the original search results 109 and a first set of items in the categorical search results 112. In some embodiments, the items in the original search results 109 and the items in the categorical search results 112 can be sorted into a rank based on a relevance to a search query 290 and/or a category. In this way, the duplication removal service 222 can traverse the items in the original search results 109 and the categorical search results 112 and remove any items that are present in both sets of search results from either the original search results 109 or the categorical search results 112.

According to some embodiments, the categorical search results 112 may be limited to a predefined number of items because the categorical search results 112 are displayed in a summary banner 106 with limited space on the user interface. The categorical search results 112 may also be divided into groups of a predefined number to display on each partition of the summary banner 106. For example, suppose the categorical search results 112 have a limit of sixteen items and are ordered according to a rank based on relevance. In this case, there may be a group of four items from the categorical search results 112 displayed in each partition of the summary banner 106.

The duplication removal service 222 may identify the first four items in the categorical search results 112 and the first five items in the original search results 109, for example. The duplication removal service 222 may determine if any of the first four items in categorical search results 112 are the same as any of the first five items in the original search results 109. If there are any duplicate items, the duplication removal service 222 may remove the duplicate item from the categorical search results 112 and/or the original search results 109. The other items that were positioned behind the duplicate item may be moved up in the ranking to fill the position of the removed duplicate item. In one embodiment, the duplication removal service 222 may append the duplicate item to the end of the ranking of items of the categorical search results 112.

In some embodiments, the duplication removal service 222 can compare a first set of items in the categorical search results 112 with a first set of items in the original search results 109. The first set of items in the categorical search results 112 may be a predefined number of items that are, for example, displayed in a first section of a summary banner 106 (FIG. 1) of a user interface. The first set of items in the original search results 109 may be a predefined number of items that are displayed in a grid format below the summary banner 106 on the user interface. For example, the first set of the items in the original search results 109 that are being compared may include the first two rows of items that are displayed below the summary banner 106.

According to some embodiments, the category summary generator 225 is executed to refine the categorical search results 112 to include only items specific to a category. The category may be pre-defined to be a default category. Alternatively, the category may be specified by the user via a user interface or in a user setting, for example. In one embodiment, the category may include a plurality of subcategories, and the category summary generator 225 may be configured to include only one of each of the subcategories in the categorical search results 112. For example, in the scenario where the search query 290 is for "shirts" and the category is brands, the subcategories may each be a different brand. In this way, the categorical search results 112 may be limited to include shirts of different brands only.

As an illustrative example, in the situation where the maximum number of items permitted in the categorical search results 112 is thirty, each of the thirty shirts in the categorical search results 112 may be of a different brand. The category summary generator 225 may be configured to remove second instances of each of the subcategories from the categorical search results 112. In one embodiment, the category summary generator 225 may be executed to remove second instances of each of the subcategories after the duplication removal service 222 has removed duplicate items from at least a portion of the categorical search results 112.

The data stored in the data store 212 includes, for example, item data 227, categories 236, user account data 239, and potentially other data. The item data 227 may include data used to describe each one of a plurality of items, such as, for example, item title, item description, item price, item quantity, item options, item number, item images, and/or other data. In one embodiment, the items comprise products and/or media content offered for sale by an online retailer. In other embodiments, the items may comprise services, advertisements, network pages, social networking profiles, keywords or phrases used in tagging, images, audio content, video content, digital content items, and/or other items.

Categories 236 may be associated with specific characteristics of items in that category 236. In addition, categories 236 may be associated with departments of online retailers by which items can be accessed. For example, categories 236 may be associated with fashion, media content, video games, electronics, books, home goods, sports and outdoors, automotive, and/or any other general characteristics associated with an item. Categories 236 may also be associated with specific characteristics of items in that category 236. As an illustrative example, categories 236 may include brands, colors for fashion items, shapes for fashion items, styles of fashion items, age groups, specific clothing items, actors, directors, authors, genre, types of media items, types of video games, compatible devices, and/or any other characteristics associated with an item.

The categories 236 may each be associated with a plurality of subcategories 244. In particular, the subcategories 244 may be associated with a subordinate category or a division of the category 236. For example, suppose a user selects a category 236 of brands. The various subcategories 244 may be the various brands available for a specific search query. In this way, when a user enters a search query, the original search results 109 may include a plurality of items related to the content of the search results. In addition, the categorical search results 112 may include a plurality of items associated with a predefined number of relevant brands. Each of the items in the categorical search results 112 may be associated with a different subcategory 244.

In one embodiment, the category 236 for a given search query 290 may be set to a default category by a client 206 of a user via a user interface. For example, the default category 236 for fashion-related searches may be set to brands. In another embodiment, the category 236 for the given search query 290 may be set by the client 206 of the user via the same user interface that the client 206 enters the search query 290 into. In other words, the category 236 may be specified by the user at the same time the user enters a search query 290 to generate a customized search results for the user.

In yet another embodiment, the category 236 may be predefined by a user via a user interface in settings or preferences associated with the user. In one embodiment, the user may set preferences to associate specific categories 236 for different types of search queries. For example, the client 206 may set a preference such that search results associated with video games be displayed with a summary banner 106 based on the category 236 of genres. In this way, if a user searches for video games, then a summary banner 106 will be automatically displayed in a user interface with the original search results 109 in which the summary banner 106 includes at least a predefined number of video games associated with different genres.

The data store 212 may also include user account data 239, which may be associated with third-party data 247, purchase history 250, search history 253, and potentially other data. The user account data 239 may be associated with a user. For example, a user may include a family of four individual users, a small entity of twenty individual users, etc. The user may also be associated with the client 206. In this regard, the client 206 may be registered as a device associated with the user account data 239. The user account data 239 may further include, for example, user credentials, a purchase history, a browse history, a wish list, etc.

The user account data 239 may be associated with third-party data 247, which may be associated with third-party environments, such as, for example, other electronic commerce environments with which the user is also associated. Third-party environments may include various platforms by which users can interact and discuss items. In this regard, third-party data 247 may include information regarding the interactions and discussion of items of interest on the third-party environments. In some embodiments, information that may be used to determine whether a user has purchased or expressed interested in an item may be imported from such third-party environments and stored in the third-party data 247.

The user account data 239 may also be associated with a purchase history 250 of the user. The purchase history 250 may include a log or record of items previously purchased by a user. In particular, the purchase history 250 may include items that the user has actively streamed and/or purchased via the electronic commerce system 215, for example. In one embodiment, the purchase history 250 may include items that the user streamed and/or purchased via a third party environment. In addition, the purchase history 250 may include items in which the user has expressed interest. For example, the electronic commerce system 215 may track activities performed by a client 206 of the user with regard to certain items to determine that a user is interested in an item.

The user account data 239 may also be associated with a search history 253 of the user. The search history 253 may include a log or record of search queries previously entered by the user. The search query 290 may include text, such as, for example, a character string. The search query 290 may also include an image, sound, video, and/or any other form of content that may be obtained from the client device. In one embodiment, the search history 253 may include data regarding search queries that the user has entered via third party environments. In one embodiment, each of the search queries stored in a search history 253 of the user may be associated with the categories 236 and subcategories 244 identified for each of the search queries. In one embodiment, each of the search queries stored in the search history 253 may also be associated with items for each of the categories 236 and subcategories 244.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 271. The display 271 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a browser 274, a media player 277, and/or other applications. The browser 274 may be executed in a client 206, for example, to access network content served up by the computing environment 203 and/or other servers, thereby rendering a user interface 280 on the display 271. To this end, the browser 274 may comprise, for example, a browser, a dedicated application, etc., and the user interface 280 may comprise a network page, an application screen, etc. In particular, the user interface 280 may be embodied as the de-duplicated brand summary interface 103b (FIG. 1) or potentially any other interface related to search results in response to a search event. The client 206 may be configured to execute applications beyond the browser 274 and the media player 277 such as, for example, email applications, social networking applications, word processors, spreadsheets, and/or other applications.

Next, a general description of the operation of the various components of the networked environment 200 is provided. The computing environment 203 may generate a user interface 280 with a search component configured to facilitate receiving a search query 290 from a client 206 associated with a user. The computing environment 203 may cause the network page to be transmitted to the client 206. The client 206 may submit a search query 290 including a search query 290 via the user interface 280 displayed on the client 206.

The item search service 219 may be configured to receive the search query 290 from the client 206. The item search service 219 may identify the original search results 109 associated with the search query 290. The item search service 219 may also identify the categorical search results 112 based on a default category 236 predefined by the user or based on a category 236 specified by the user with reference to the search query. In one embodiment, the item search service 219 may also identify whether there is a maximum number of items permitted in the categorical search results 112. If a maximum number of items is specified for the categorical search results 112, the item search service 219 may only identify the maximum number of items for the category 236 in response to the search query. Therefore, two sets of search results have been identified by the item search service 219, i.e., the categorical search results 112 and the original search results 109.

The duplication removal service 222 may then remove duplicate items that are present in both the original search results and the categorical search results 112. In one embodiment, the duplication removal service 222 may compare a set of items in the original search results 109 to a set of items in the categorical search results 112. For example, the first four items in the set of original search results 109 may be compared to the first four items in the set of categorical search results 112. The duplication removal service 222 may then determine whether at least one item in the set of items in the original search results 109 matches at least one item in the set of categorical search results 112.

According to some embodiments, the matched items may be removed from the set of categorical search results 112. In one embodiment, the removed items may then be appended to the end of the categorical search results 112. For example, suppose a user enters a search query 290 related to an item and receives a network page and/or a user interface 280 displaying the set of categorical search results 112 in a summary banner 106 and the set of original search results 109 below the summary banner 106 in a grid format. The items displayed in the first partition of the summary banner 106 may be different from at least a portion of the items from the set of original search results 109 displayed in the grid below the summary banner 106.

According to some embodiments, the category summary generator 225 may then traverse the de-duplicated items in the categorical search results 112 and delete a second instance of each of the subcategories 244 occurring in the categorical search results 112. For example, suppose a user enters a search query 290 for "television sets" and the category 236 for the search query 290 is set to be based on a display size. The categorical search results 112 may include information regarding a predetermined number of television sets having different display sizes. The subcategories 244 related to the category 236 of display size may include, for example, a display size of thirty two inches and under, thirty three to forty three inches, forty four to forty nine inches, fifty to fifty nine inches, sixty to sixty nine inches, and/or seventy inches and up. In this way, the subcategories 244 include different ranges of different display sizes available for television sets.

Suppose the categorical search results 112 include twenty television sets, three of which are included in the subcategory 244 directed to the display size of between fifty and fifty nine inches. In this case, there are three instances or occurrences of television sets that are in the same subcategory 244. In one embodiment, the category summary generator 225 may delete the repeated instances of items in the same subcategory 244 based on the order of the items in the categorical search results 112. For example, the category summary generator 225 may delete or remove the second or third instance of the subcategory 244 from the categorical search results 112. In another embodiment, the category summary generator 225 may randomly delete the repeated instances of items in the same subcategory 244.

Figure 3:
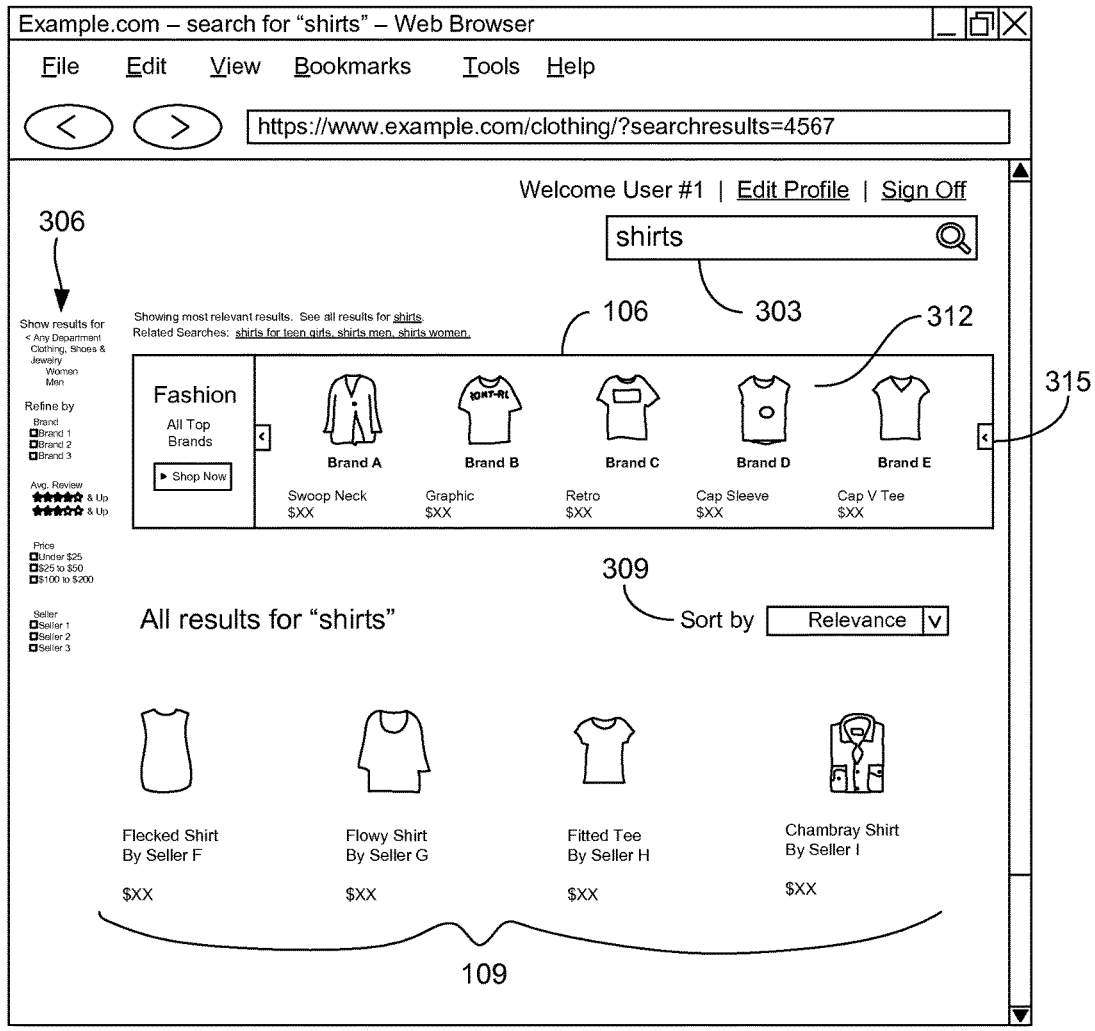
FIGS. 3-6 are pictorial diagrams of example user interfaces rendered by a client in the networked environment of FIG. 2 according to various embodiments of the present disclosure.

Referring next to FIG. 3, shown is an example user interface 280a rendered by the client 206 (FIG. 2) in the networked environment 200 of FIG. 2 according to various embodiments of the present disclosure. In the non-limiting example of FIG. 3, the user interface 280a may comprise a search results page, providing users with information about items relevant to a search query 290 provided by the user via a search component 303. As a non-limiting example, the search component 303 may be a search toolbar configured to receive a search query 290 for an item or a type of item. In the example shown in FIG. 3, the user is searching for "shirts."

The user interface 280a shown in FIG. 3 further includes the summary banner 106, refinements 306, sort component 309, a first set of original search results 109, and/or other components. As shown in FIG. 3, the first set of original search results 109 are displayed below the summary banner 106 in a grid format. The original search results 109 may be alternatively displayed in a list format.

In some embodiments, the summary banner 106 may include the items from the categorical search results 112 (FIG. 1) according to a specified rank. For example, the items displayed by the summary banner 106 may be ordered based on a relevance to the search query. In particular, the summary banner 106 may include a first partition 312 that includes a first set of the items in the categorical search results 112. The category 236 (FIG. 2) for the categorical search results 112 shown in FIG. 3 may be set to nationally-recognized brands. In this way, the subcategories 244 may each be associated with different nationally recognized brands. Therefore, the items shown in the summary banner 106 are each associated with a different subcategory 244 (FIG. 2).

As shown in FIG. 3, the items displayed in the first partition 312 of the summary banner 106 may be different from the first row of items displayed in the original search results 109. In some embodiments, the items displayed in the first partition of the summary banner 106 may be different from a predetermined number of items displayed in the original search results 109. The summary banner 106 may also include a partition separator 315 configured to facilitate navigation to the next set of items from the categorical search results 112 to be displayed in the next partition of the summary banner 106.

The first partition 312 displays a first set of items in the categorical search results 112, which may be a predetermined number of items. In the example shown in FIG. 3, the first set of items includes five items, of which each is a different brand. In response to receiving a selection of the partition separator 315 from the client 206, the next set of items from the categorical search results 112 may be displayed. Therefore, in the example shown in FIG. 3, the next set of items that may be displayed when a selection of the partition separator 315 is received may be items associated with "Brand F," "Brand G," "Brand H," "Brand I," and "Brand I."

As shown in FIG. 3, the user interface 280a also includes the refinements 306, which may include a plurality of selectable components whereby a user may further define the original search results 109 displayed by the user interface 280a. For example, the user may select the component under the heading "Price" to refine the original search results 109 to only include items that are under a certain price. The user interface 280a may also include the sort component 309, which may be configured as a drop box menu or a selectable menu by which the user may select a preferred order in which the items in the original search results 109 are displayed. For example, as shown in FIG. 3, the user may select the sort component 309 to be "Relevance" when the user wishes to see items in an order of relevance to a search query.

Figure 4:
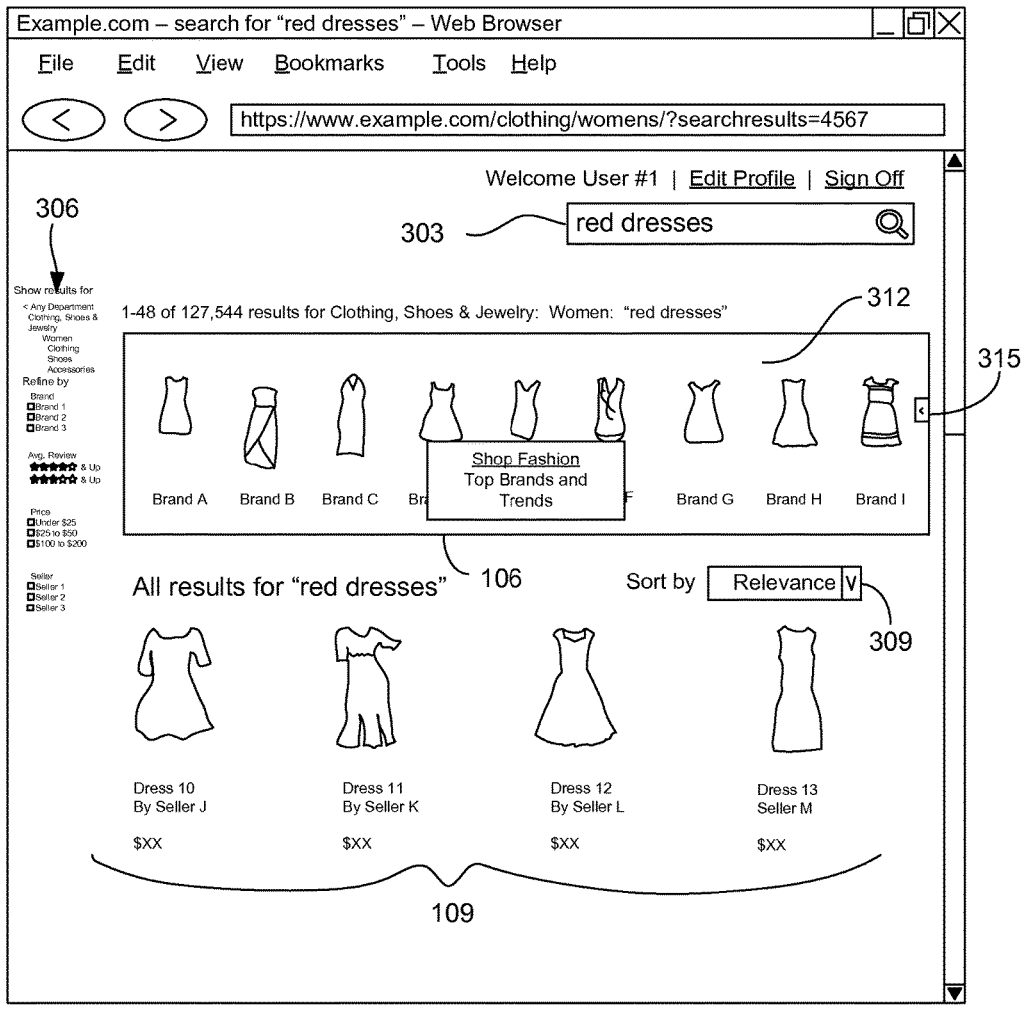

Turning now to FIG. 4, shown is a pictorial diagram of an example user interface 280b rendered by the client 206 (FIG. 2) in the networked environment 200 of FIG. 2 according to various embodiments of the present disclosure. In the non-limiting example of FIG. 4, the user interface 280b may include a search results page, providing users with information about items relevant to a search query 290 provided by the user. Similar to the user interface 280a shown in FIG. 3, the user interface 280b includes the summary banner 106, refinements 306, sort component 309, a first set of original search results 109, and/or other components.

In the example shown in FIG. 4, the user has entered a search query 290 for "red dresses." Therefore, the user interface 280b depicted in FIG. 4 is a search results page for the search query 290 of "red dresses." A first set of items from the original search results 109 is displayed below the summary banner 106 on the user interface 280b. Specifically, the first set of items from the original search results 109 shown in FIG. 4 includes Dress 10, Dress 11, Dress 12, and Dress 13. In this way, the first set of items in the original search results 109 is different from the items shown in the first partition 312 of the summary banner 106.

In some embodiments, the first partition 312 of the summary banner 106 includes a first set of items from the categorical search results 112 (FIG. 1). In the example shown in FIG. 4, the first partition 312 of the summary banner 106 includes the first nine red dresses from the categorical search results 112. The category 236 specified for the categorical search results 112 shown in FIG. 4 may be associated with nationally recognized brands. Therefore, the subcategories 244 may each be associated with different nationally-recognized brands. Therefore, each of the nine red dresses shown in the first partition 312 of the summary banner 106 are associated with different subcategories 244 (FIG. 1) or different nationally-recognized brands.

Figure 5:
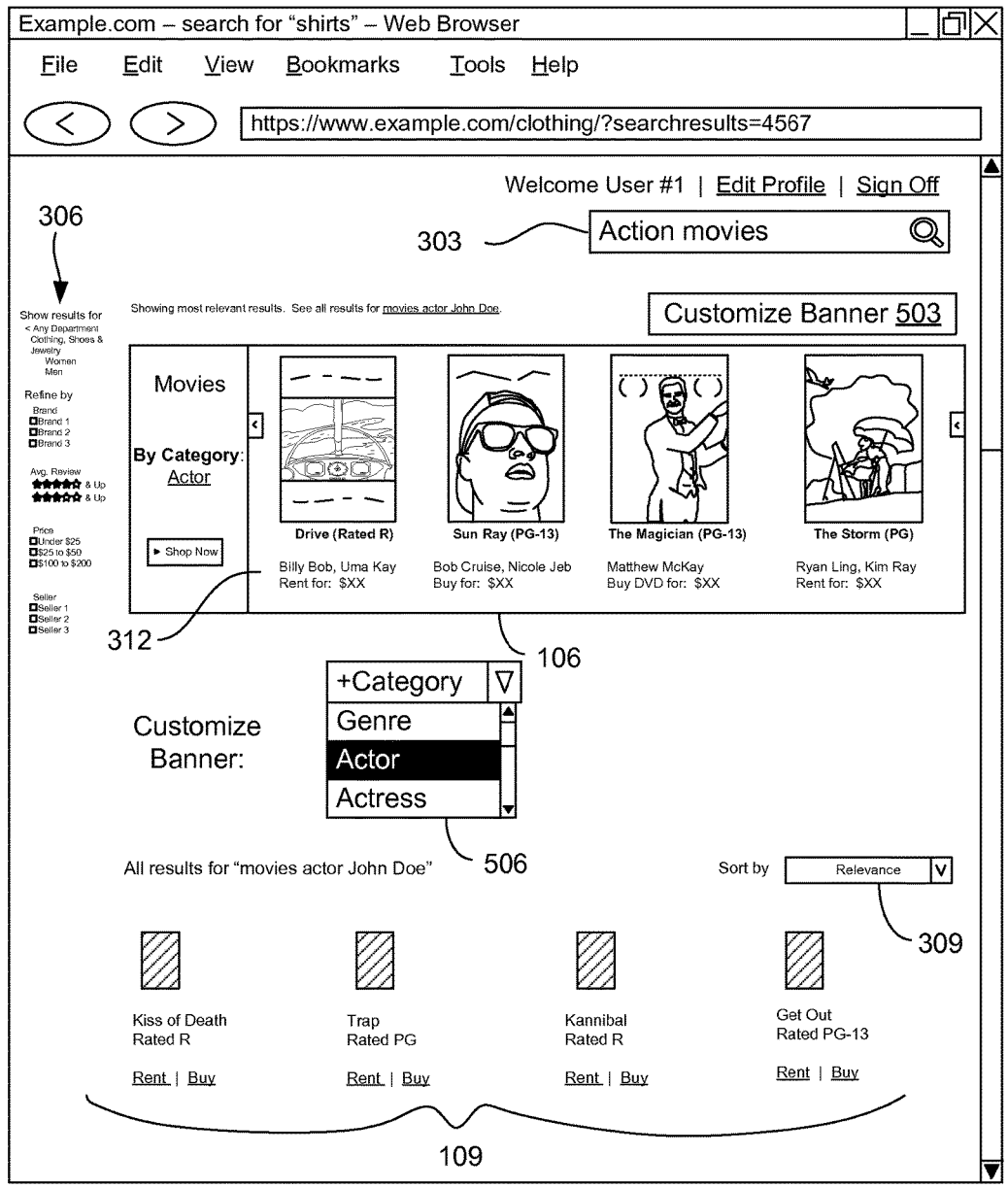

Moving on to FIG. 5, shown is a pictorial diagram of an example user interface 280c rendered by the client 206 (FIG. 2) in the networked environment 200 of FIG. 2 according to various embodiments of the present disclosure. In the non-limiting example of FIG. 5, the user interface 280c may include a search results page, providing users with information about items relevant to a search query 290 provided by the user. Similar to the user interface 280a shown in FIG. 3, the user interface 280c includes the summary banner 106, refinements 306, sort component 309, a first set of original search results 109, and/or other components. As shown in FIG. 5, the user interface 280c further includes a customize banner component 503, category selection component 506, and/or potentially other components.

In the example shown in FIG. 5, the user has entered a search query 290 for "action movies." In one embodiment, the user interface 280c may be automatically generated to display a summary banner 106 with categorical search results 112 (FIG. 1) including different movies in which John Doe appears. In another embodiment, the user may request to customize the banner by selecting the customize banner component 503. The user may be prompted to manually enter and/or select a category 236 to facilitate generating the categorical search results 112 for the entered search query. In such an embodiment, the user may be prompted to select at least one of a plurality of categories 236 from the category selection component 506. In other embodiments, the user may prompted to select from a list or manually enter or submit a category.

As shown in FIG. 5, a pre-populated drop down menu with relevant categories 236 (FIG. 2) for the search query 290 may be presented to the user via the category selection component 506. In one embodiment, the user may be select one of the pre-populated categories 236 to generate the categorical search results 112 and the summary banner 106. For example, suppose the user selected the category 236 of actors. Then the categorical search results 112 may include a predetermined number of movies from various different actors. In one embodiment, the order of the movies may be determined based on various factors, such as, for example, popularity, a user consumption history, age group, third-party data 247 (FIG. 2), and/or other data related to the user and/or actor.

In another embodiment, the user may be prompted to further refine the category 236 selected by manually entering additional information via the user interface 280c. For example, suppose a user has selected the category 236 of "Actor" via the category selection component 506, the user may manually enter text identifying a specific actor using a category entry component. In one embodiment, suggested categories 236 may be identified and populated in a drop down menu to be presented to the user.

As shown in FIG. 5, the user has selected the category 236 be based on actors. Therefore, the first partition 312 of the summary banner 106 includes a first group of movies that are each related to the search query of "Action movies." Similarly, each of the movies shown in the first partition 312 of the summary banner 106 is associated with different actors. Further, each of the items of the first set of the original search results 109 are different from each of the items in the first set of the categorical search results 112. As shown in FIG. 5, each of the items in the top row of the original results 109 are different from each of the items in the first partition 312 of the summary banner 106.

Figure 6:
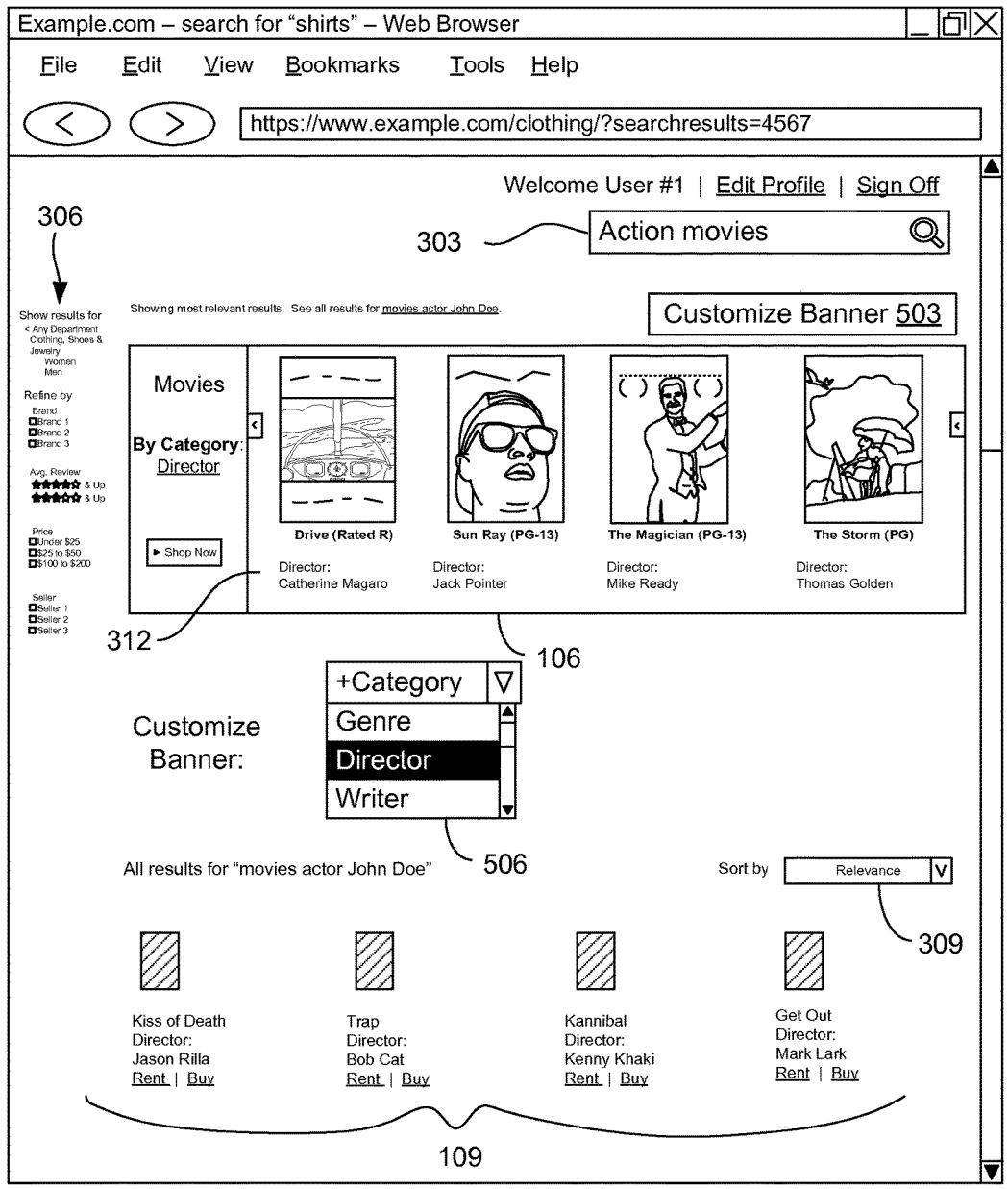

Turning now to FIG. 6, shown is a pictorial diagram of an example user interface 280d rendered by the client 206 (FIG. 2) in the networked environment 200 of FIG. 2 according to various embodiments of the present disclosure. In the non-limiting example of FIG. 6, the user interface 280d is similar to the user interface 280c of FIG. 5. As shown in FIG. 6, the user has entered a search query 290 of "Action movies," and the user interface 280d, the user has selected a category 236 of "Director." Therefore, the movies from categorical search results 109 shown in the first partition 312 of the summary banner 106 include action movies with different directors. In particular, as shown in FIG. 6, each of the movies shown in the first partition 312 each have been designated to be associated with a different director. In addition, each of the movies shown in the first partition 312 are different from at least the first row of movies from the original search results 109 shown in the user interface 280d.

Figure 7:
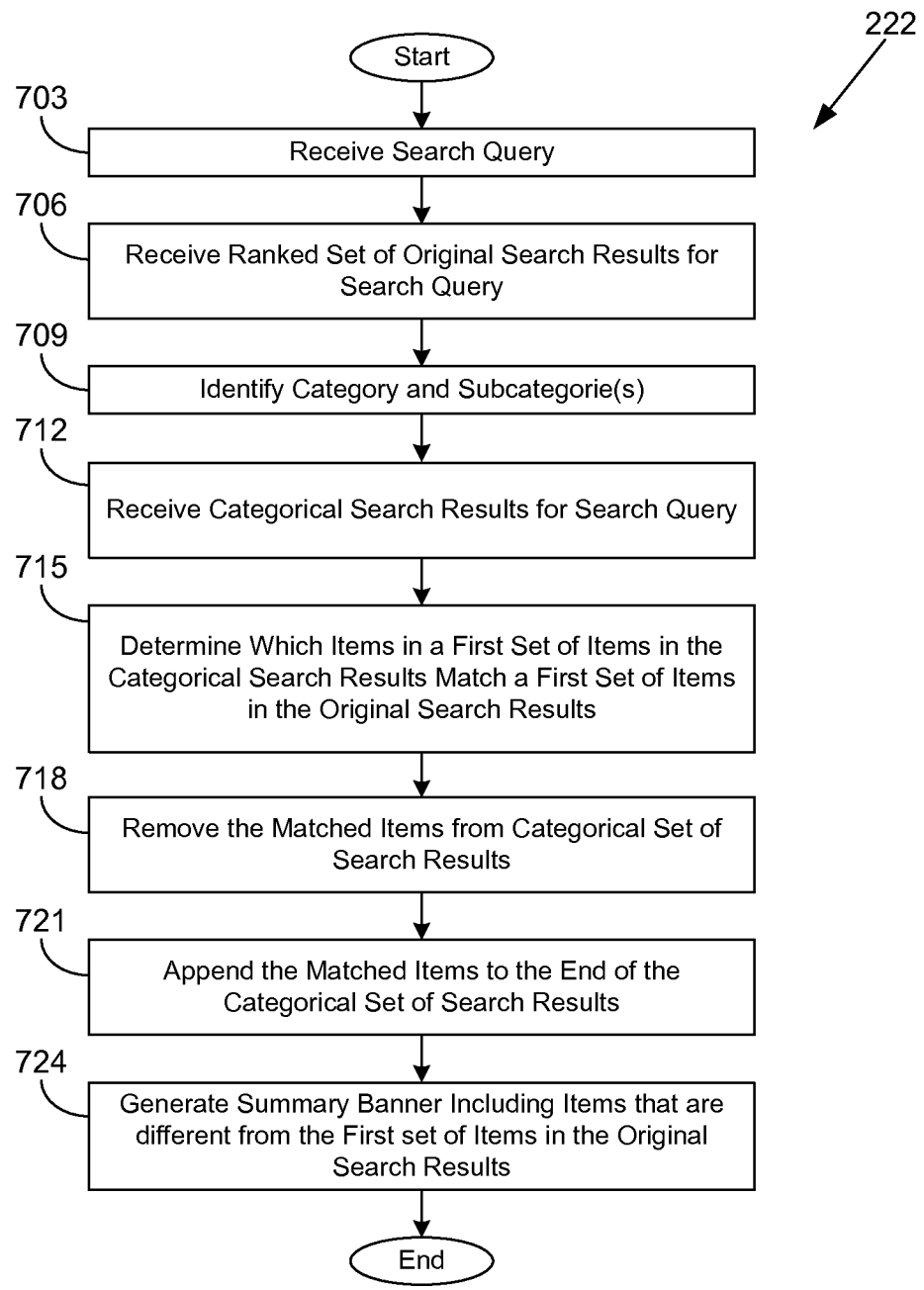
FIG. 7 is a flowchart illustrating one example of functionality implemented as portions of a duplication removal service executed in a computing environment in the networked environment of FIG. 2 according to various embodiments of the present disclosure.

Referring next to FIG. 7, shown is a flowchart that provides one example of the operation of a portion of the duplication removal service according to various embodiments. It is understood that the flowchart of FIG. 7 provides merely an example of the many different types of functional arrangements that may be employed to implement the operation of the portion of the duplication removal service 222 as described herein. As an alternative, the flowchart of FIG. 7 may be viewed as depicting an example of elements of a method implemented in the computing environment 203 (FIG. 2) according to one or more embodiments.

Beginning with box 703, a search query 290 (FIG. 2) may be received from a client 206 (FIG. 2). The search query 290 may be received via a user interface 280 (FIG. 2) displayed on the client 206. As an illustrative example, the search query 290 may include textual content describing an item that the user is searching for within the electronic commerce system.

Next, in box 706, the original search results 109 (FIG. 1) may be identified based on the search query 290. The original search results 109 may include items listed in order of relevance to the search query 290, for example. In one embodiment, the original search results 109 may be limited to a maximum number of items. In box 709, a category 236 (FIG. 2) and subcategories 244 (FIG. 2) may be identified to determine the categorical search results 112 (FIG. 1). In one embodiment, the category 236 may be set to a default by a user preference or by the computing environment 203.

In one embodiment, the category 236 may be set to a default for each type of item or department with which an item is associated via the electronic commerce system 215 (FIG. 2). For example, all fashion-related search inquiries may have a default category 236 set as brands. Similarly, all electronics-related search inquiries may have default category 236 set as brands. Alternatively, the default category 236 may be set to be the same regardless of the content of the search query. In one embodiment, the category 236 may be defined by the user via a user interface 280 either before or after initiating a search query 290. For example, the user may set preferences to certain categories 236 for certain types of search inquiries. The user may also be prompted to select or enter at least one category 236 and/or subcategory 244 while entering a search query.

Next, in box 712, the categorical search results 112 may be received in response to receiving the search query. The categorical search results 112 may include a plurality of items associated with the content of the search query 290 and the category 236 and/or subcategory 244. In box 715, the items in at least a subset of the items in the categorical search results 112 to the items in at least a subset of the items in the original search results 109 may be determined. In particular, the first set of items in the first partition 312 (FIG. 3) of the summary banner 106 (FIG. 1) may be compared to a predefined number of items in the beginning of the original search results 109. For example, the first four items of the categorical search results 112 may be compared to the first row of items displayed in user interface 280 of the original search results 109. The items that are matched to be the same in both the first set of items in the categorical search results 112 and the first set of items in the original search results 109 may be identified.

In box 718, the items that are matched may be removed from the set of categorical search results 112. In an embodiment in which the items in the categorical search results 112 are stored in the form of an ordered list or queue, the matched items may be deleted from the categorical search results 112. The remaining items in the categorical search results 112 may be moved up to replace the deletion of the matched items. In another embodiment, the items that are matched may alternatively be removed from the original search results 109 in a similar manner.

In box 721, the matched items may be appended to the end of the categorical search results 112 or the original search results 109. In one embodiment, the matched items are only appended to the end of the categorical search results 112 if none of the matched items are displayed in the first partition 312 of the summary banner 106. Next, in box 724, a summary banner 106 is generated in which the first partition 312 includes a first set of items from the categorical search results 112 that are different from at least a first set of items displayed in the original search results 109.

Figure 8:
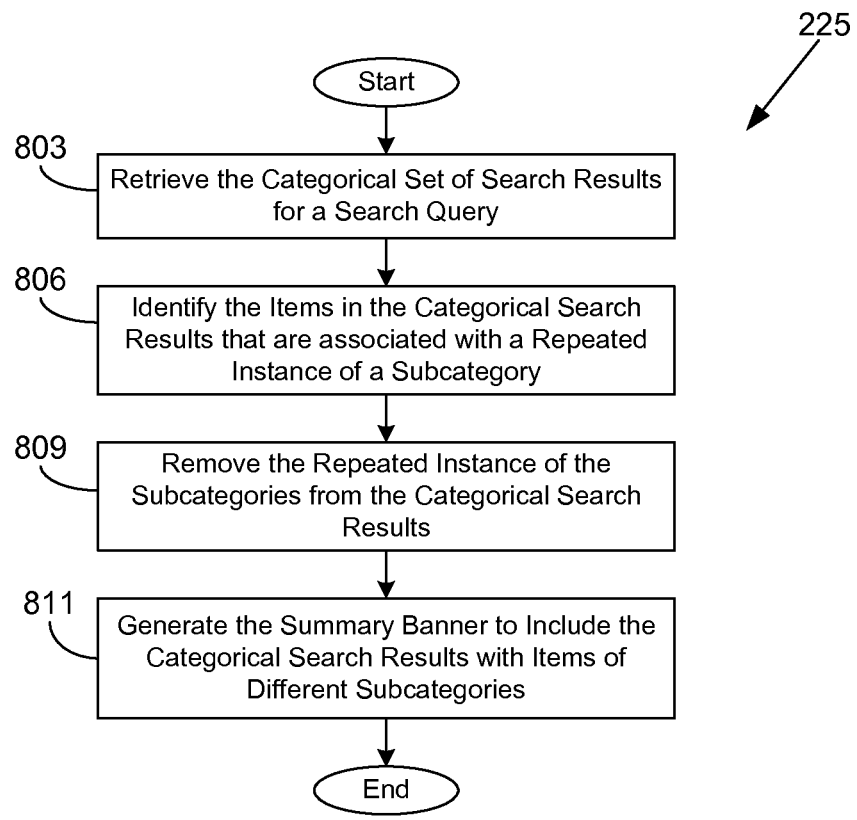
FIG. 8 is a flowchart illustrating one example of functionality implemented as portions of a category summary generator executed in a computing environment in the networked environment of FIG. 2 according to various embodiments of the present disclosure.

Referring next to FIG. 8, shown is a flowchart that provides one example of the operation of a portion of the category summary generator 225 according to various embodiments. It is understood that the flowchart of FIG. 8 provides merely an example of the many different types of functional arrangements that may be employed to implement the operation of the portion of the category summary generator 225 as described herein. As an alternative, the flowchart of FIG. 8 may be viewed as depicting an example of elements of a method implemented in the computing environment 203 (FIG. 2) according to one or more embodiments.

Beginning with box 803, the de-duplicated categorical search results 112 (FIG. 1) generated by the duplication removal service 222 (FIG. 2) may be obtained. The de-duplicated categorical search results 112 includes items that are not the same as at least a first quantity of the items displayed of the original search results 109 (FIG. 1). Next, in box 806, the items in the categorical search results 112 (FIG. 1) are examined to identify the subcategory 244 (FIG. 2) associated with each of the items. In particular, the items that are a repeated instance or occurrence of each subcategory 244 are identified. For example, suppose that the categorical search results 112 includes four items associated with the same subcategory 244, three of the items may be identified as repeated instances of the subcategory 244. In one embodiment, the three repeated instances may be identified based on the order provided, such that only the first instance of a subcategory 244 remains in the categorical search results. In another embodiment, the repeated instances of the subcategory 244 may be identified and deleted in a random order.

In addition, the repeated instances of the subcategory 244 may be removed from the categorical search results 112 and then appended to the categorical search results 112. For example, in the case where there is less than a maximum number of items identified for the categorical search results 112, the repeated instances of the subcategory 244 may be appended to the categorical search results 112. In this way, the user may still access the repeated instances of the subcategory 244 via at least the last partition of the summary banner 106.

In one embodiment, the repeated instances of the subcategories 244 may also be removed from at least a subset of the original search results 109. For example, a repeated instance of the subcategories 244 may be the first item in the original search results 109. In this case, the first item in the original search results 109 may be removed. In one embodiment, only the first row of items in the original search results 109 may be examined to remove the repeated instances of the subcategories 244.

In box 809, the repeated instances of the subcategories 244 are removed from the categorical search results 112. In such a case, three of the items associated with the same subcategory 244 may be deleted or removed from the categorical search results 112. In this way, the categorical search results 112 and the summary banner 106 (FIG. 1) includes items of different subcategories 244 so that the user gets a summary of the different subcategories 244 available with regard to the search query 290 (FIG. 2) and the given category 236 (FIG. 2).

In one embodiment in which the categorical search results 112 includes less than a predefined maximum number of items, the repeated instances of the subcategories 244 may remain in the categorical search results. If the user searches for an exclusive item with relatively few descriptive subcategories 244, there may be a limited number of relevant items. For example, if a user is searching for a rare garment with a category 236 defined to be based on brands, then the categorical search results 112 may include less than four items. In such a case, the repeated instances of the subcategories 244 may remain in the categorical search results 112 to be displayed in the summary banner 106.

In box 811, the categorical search results 112 may be finalized to be included in the summary banner 106. Each of the items remaining the categorical search results 112 may be associated with different subcategories 244. The summary banner 106 may be partitioned into different partitions based on the number of items in the categorical search results 112. The items displayed in the first partition 312 of the summary banner 106 may each be of different subcategories 244 and may each be different than the first set of items displayed below the summary banner 106.

Figure 9:
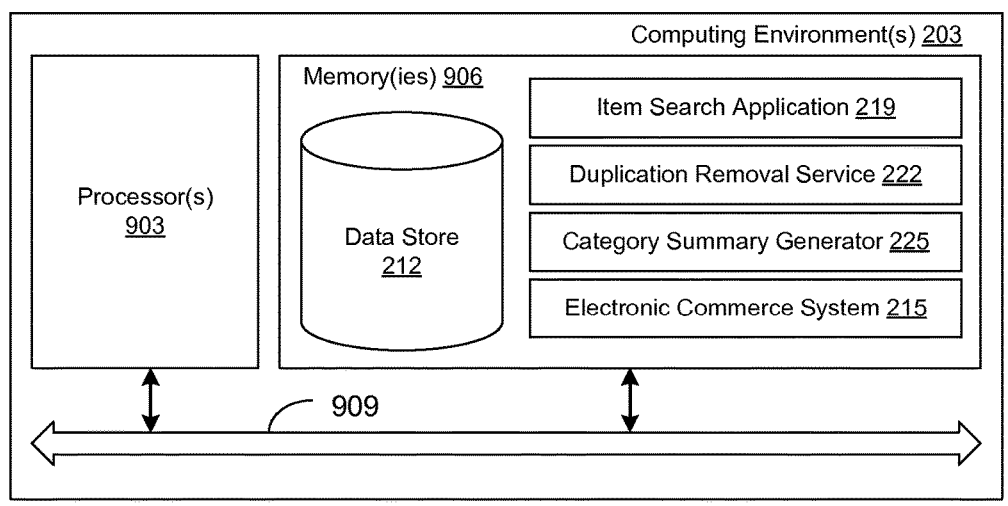
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices. Each computing device includes at least one processor circuit, for example, having a processor 903 and a memory 906, both of which are coupled to a local interface 909. To this end, each computing device may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the electronic commerce system 215, item search application 219, duplication removal service 222, category summary generator 225, and potentially other applications. Also stored in the memory 906 may be a data store 212 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the electronic commerce system 215, item search application 219, duplication removal service 222, category summary generator 225, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7 and 8 show the functionality and operation of an implementation of portions of the electronic commerce system 215, item search application 219, duplication removal service 222, category summary generator 225. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. Further, in some embodiments, one or more of the blocks shown in FIGS. 7 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, item search application 219, duplication removal service 222, category summary generator 225, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, item search application 219, duplication removal service 222, category summary generator 225, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing environment 203 or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   obtain a search query from a client device associated with a user;
   obtain search results based at least in part on the search query;
   obtain categorical search results based at least in part on the search query and a selected category, the categorical search results comprising an ordered list of items corresponding to the selected category;
   identify at least one duplicate item that is included in the categorical search results and the search results;
   generate a revised set of categorical search results by removing the at least one duplicate item from an initial position in the ordered list and placing the at least one duplicate item at an end of the ordered list;
   generate the revised set of categorical search results by further removing at least one item corresponding to a particular brand from the revised set of categorical search results based at least in part on determining that multiple items included in the categorical search results are associated with the particular brand; and
   provide a user interface comprising a banner that includes a subset of the revised set of categorical search results.

2. The non-transitory computer-readable medium of claim 1, wherein the search results include a plurality of items selected in response to associating a content of the search query to a description of individual ones of the plurality of items.

3. The non-transitory computer-readable medium of claim 1, wherein the ordered list of items of the categorical search results includes a plurality of items selected in response to associating the search query and the selected category to a description of individual ones of the plurality of items.

4. A system, comprising:
   a data store configured to store data associated with a plurality of items;
   at least one computing device in communication with the data store, the at least one computing device configured to at least:
   obtain a set of search results in response to obtaining a search query from a client device;
   obtain a ranked set of categorical search results based at least in part on the search query and a category;
   identify at least one duplicate item by determining that the at least one duplicate item is included in the ranked set of categorical search results and the set of search results;
   revise the ranked set of categorical search results by moving the at least one duplicate item from an initial position the to an end of the ranked set of categorical search results; and
   provide a user interface comprising a subset of the set of search results and a banner that includes a subset of the ranked set of categorical search results to the client device.

5. The system of claim 4, wherein the at least one duplicate item is identified by further determining that the at least one duplicate item is included in a first subset of the set of search results, wherein the first subset of the search results includes a predefined number of a plurality of items in a beginning of the set of search results.

6. The system of claim 4, wherein the search query is associated with at least one of an item, a category, a brand, a type of item, a genre, a title, an artist, an actor, a price, or a ranking.

7. The system of claim 4, wherein the set of search results includes a plurality of items selected in response to associating a content of the search query to a description of individual ones of the plurality of items.

8. The system of claim 4, wherein the ranked set of categorical search results includes a plurality of items selected in response to associating a content of the search query and the category to a description of individual ones of the plurality of items.

9. The system of claim 4, wherein the ranked set of categorical search results includes a plurality of items, individual ones of the plurality of items associated with a recognized brand.

10. The system of claim 4, wherein the ranked set of categorical search results includes a plurality of items, individual ones of the plurality of items associated with the category, the category being specified by the client device.

11. The system of claim 4, wherein the ranked set of categorical search results are sorted in a rank according to a relevance to the category.

12. A method, comprising:
   determining, by at least one computing device, that at least one first item is included in an ordered set of categorical search results and a set of original search results, wherein the set of original search results is associated with a search query, and the ordered set of categorical search results is associated with the search query and a category;
   removing, by the at least one computing device, the at least one first item from the ordered set of categorical search results based at least in part on the at least one first item being included in the ordered set of categorical search results and the set of original search results;
   determining, by the at least one computing device, that the ordered set of categorical search results includes at least two items from a particular subcategory of the category;
   removing, by the at least one computing device, at least one of the at least two items from the ordered set of categorical search results; and
   providing, by the at least one computing device, a user interface comprising a subset of the set of original search results and a banner that includes a subset of the ordered set of categorical search results to a client device.

13. The method of claim 12, further comprising moving, by the at least one computing device, the at least one first item from an initial position in the ordered set of categorical search results to an end of the ordered set of categorical search results.

14. The method of claim 12, wherein the ordered set of categorical search results includes a plurality of items associated with the search query and the category.

15. The method of claim 12, wherein the set of original search results includes a plurality of items that are associated with the search query, and wherein the search query is received from the client device.

16. The method of claim 12, wherein the banner includes a description for a subset of a plurality of items of the ordered set of categorical search results.

17. The method of claim 12, wherein the user interface includes the set of original search results in a grid format.

18. The method of claim 12, further comprising obtaining, by the at least one computing device, the set of original search results in response to obtaining the search query from the client device.

19. The method of claim 12, further comprising obtaining, by the at least one computing device, the ordered set of categorical search results in response to obtaining the search query from the client device.

20. The method of claim 12, wherein the ordered set of categorical search results are sorted in a rank based at least in part on a relevance to the search query and the category, the category being specified by the client device.

* * * * *